United States Patent

[11] 3,591,931

[72] Inventor Donald H. Schuster
    Ames, Iowa
[21] Appl. No. 872,695
[22] Filed Oct. 30, 1969
[45] Patented July 13, 1971
[73] Assignee Iowa State University Research Foundation
    Ames, Iowa
    Continuation-in-part of application Ser. No.
    655,045, July 21, 1967, now Patent No.
    3,523,374.

[54] ADAPTIVE AUDITORY PATTERN RECOGNITION SYSTEM FOR DRIVER TRAINING AND TESTING EQUIPMENT
9 Claims, 8 Drawing Figs.

[52] U.S. Cl. ............................................. 35/11, 35/22
[51] Int. Cl. .............................................. G09b 9/02
[50] Field of Search ................................... 35/11, 22

[56] References Cited
UNITED STATES PATENTS

| | | | |
|---|---|---|---|
| 2,870,548 | 1/1959 | Chedister | 35/11 |
| 3,015,169 | 1/1962 | Chedister | 35/11 |
| 3,108,384 | 10/1963 | Jazbutis et al. | 35/11 |
| 3,186,110 | 6/1965 | Smyth | 35/11 |
| 3,251,142 | 5/1966 | Jazbutis | 35/11 |
| 3,266,173 | 8/1966 | Sheridan | 35/11 |
| 3,266,174 | 8/1966 | Bechtol et al. | 35/11 |
| 3,523,374 | 8/1970 | Schuster | 35/11 |

Primary Examiner—Wm. H. Grieb
Attorney—Zarley, McKee & Thomte

ABSTRACT: A driver trainer simulator involving a movie film for portraying a series of driving situations projected on a screen in view of a driver station on a driver trainer unit, the movie film being encoded with electrical signals which correspond to successive driving situations on the film and are compared with signals received from the driving controls of the driver trainer upon being operated by a student, an instantaneous display panel for indicating the correctness of the response by the student to each of the successive driving situations and a permanent magnetic-recording means for storing the comparative information. An adaptive stressor unit having an audio unit may be simultaneously used to provide secondary auditory perceptual loading on the student. An auditory pattern recognition device including an audio pickup may be provided to receive the audible responses from the student in response to the sound patterns from the stressor unit. An indicator is provided for indicating correct and incorrect audible responses as compared with the audible responses from the audio unit of the stressor unit. The recognition device indicator may be coupled to the stressor unit to control the rate of loading of the auditory signals on the student.

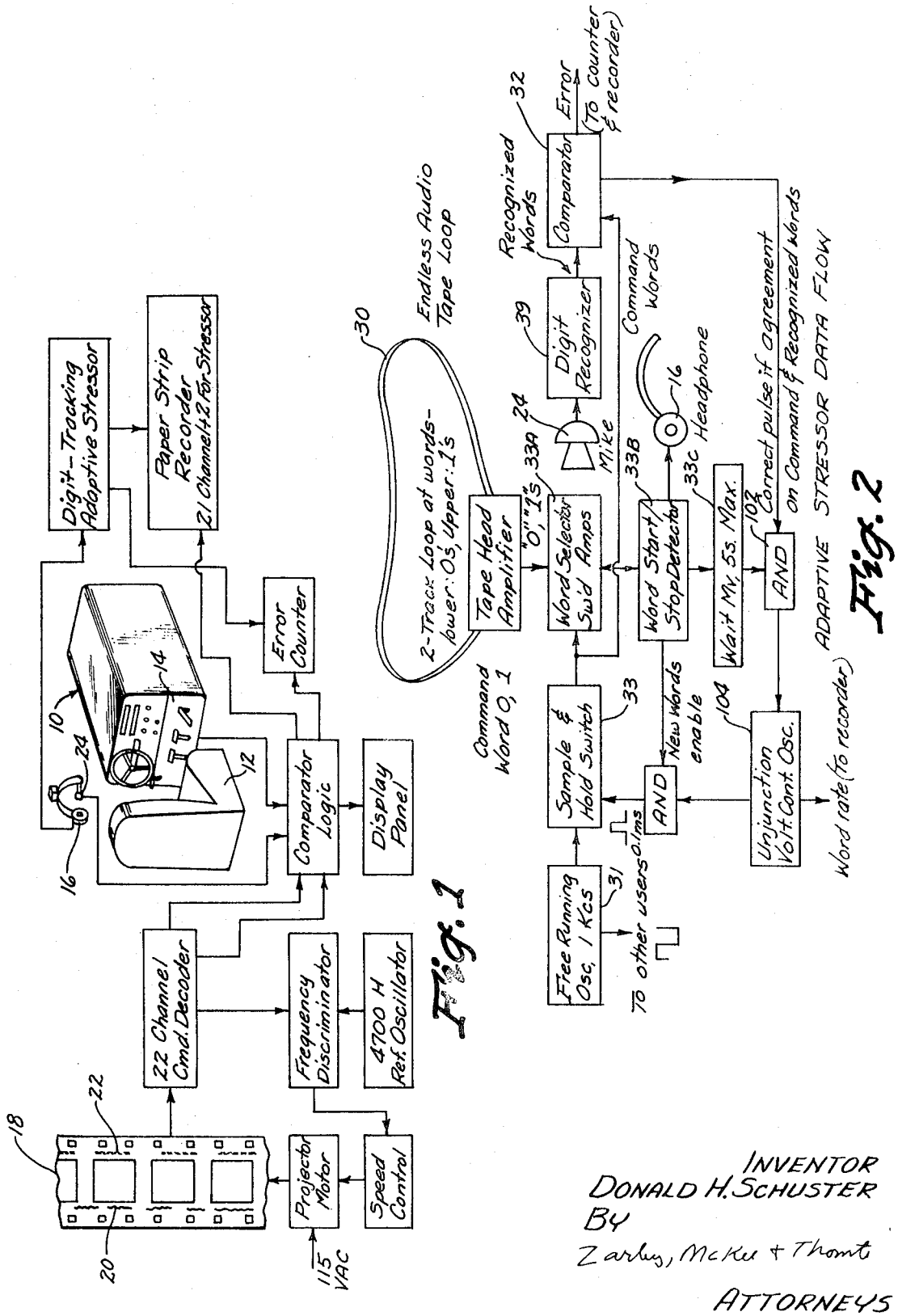

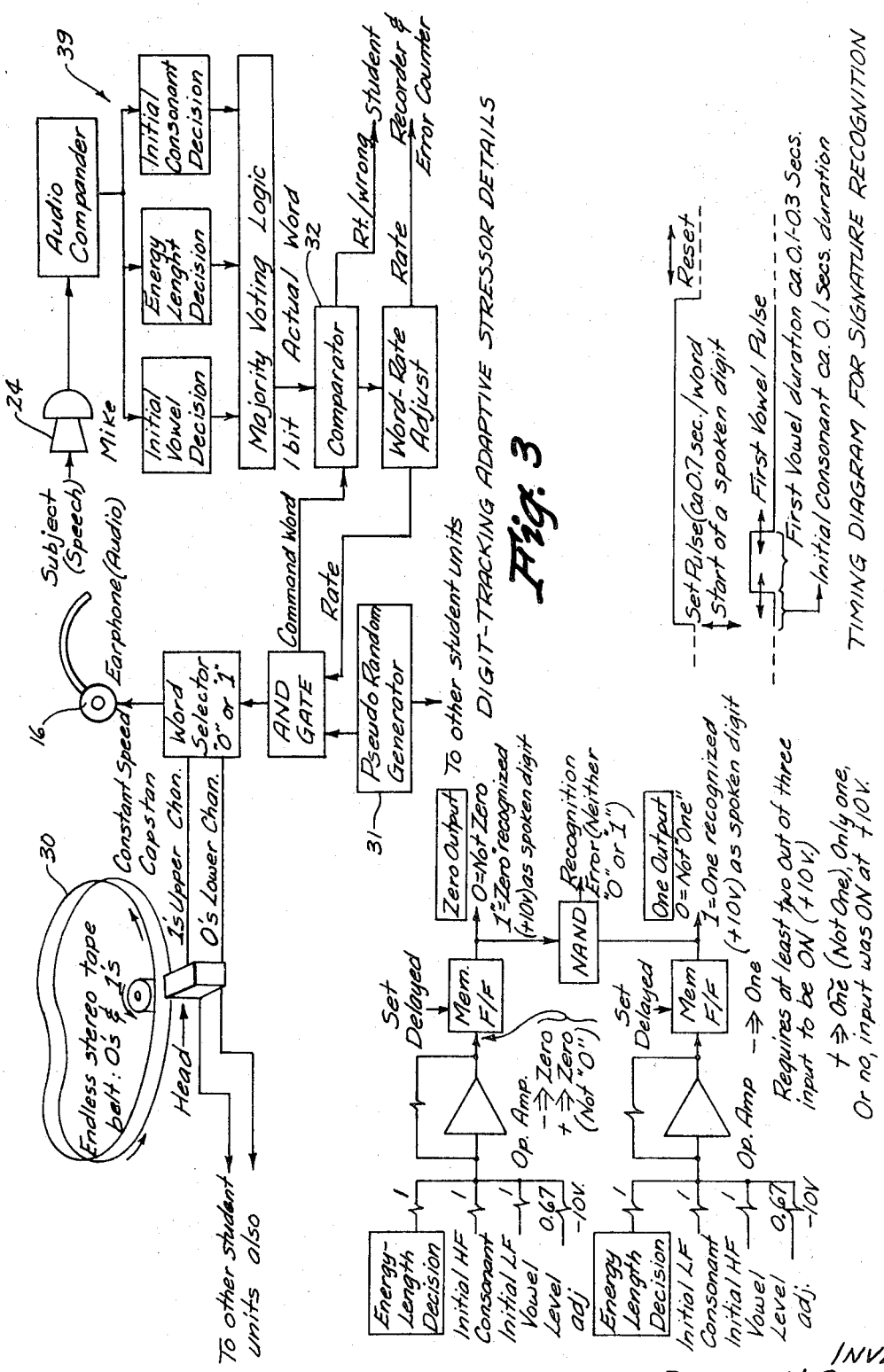

ADAPTIVE WORD LENGTH DECIDER CIRCUIT

HIGH AND LOW PASS FILTER CIRCUITS WITH ELECTRONICALLY CONTROLLABLE CUTOFF FREQUENCIES

INVENTOR
DONALD H. SCHUSTER
BY
Harley, McKee & Thomte
ATTORNEYS

ADAPTIVE AUDITORY PATTERN RECOGNITION SYSTEM FOR DRIVER TRAINING AND TESTING EQUIPMENT

This is a Continuation-In-Part application of my copending application Ser. No. 655,045 filed July 21, 1967, now U.S. Pat. No. 3,523,374, issued Aug. 11, 1970.

Numerous studies have been made which indicate that neither group therapy nor special training classes are effective in causing problem drivers to improve in their driving skills more than the improvement resulting from those left alone for the same period of time. Group psychotherapy for problem drivers has also been used and proven ineffective. The results and conclusions from extensive experimentation and studies indicate that group psychotherapy, group driver improvement meetings, and special training for problem drivers are not effective in assisting problem drivers to improve their subsequent violation and accident records, compared to a control group. This invention is directed to what is believed to be an effective training equipment for problem drivers. This invention combines realistic driver-training films with auditory shadowing which requires the subject to recognize and repeat spoken digits. Problem drivers will be induced to change their driving habits on the basis of undergoing operant training via realistic simulator and training movies as well as by the inclusion of spoken digit tracking as stress.

The theory of the use of this equipment is that the training group utilizing operant conditioning learning to cope with accident situations will utilize driver simulators to respond to potential accident scenes in films. The drivers thus consciously should learn to avoid the accident situation 100 percent of the time. However, the problem with problem drivers is that they know consciously the correct driving behavior to avoid accidents and moving violations, but they do not manifest this behavior while driving. Therefore, this is corrected by having the students learn to respond to driving situations while they are stressed simultaneously. Thus the problem drivers will have learned how to react safely and subconsciously to accident driving situations in real life without having to stop and think about it, and in spite of a retained problem driving attitude.

Drivers will have the usual mechanical aspects of the car in the simulator and in addition feedback devices will be employed. For every safe response made to a potential accident situation shown in a driving scene the driver will receive a green light to signify correct behavior. If the driver responds with some inappropriate response or too late, a legend panel will be lighted indicating the correct response that the driver should have taken to avoid the accident. Response scores will be recorded for each driver, and each driver will go through the driving films repetitively until he achieves the score of 99 percent correct responses on all of the potential accident scenes. A level of stress is added to that imposed by reacting correctly to potential accident situations depicted on the motion picture film. The controllable stress will be secondary perceptual loading. Each driver will be presented with a random auditory string of spoken zeros and ones. As soon as he hears a digit, the driver must simply repeat it aloud. A simple auditory pattern recognition device is used to determine whether the driver responded with a zero or a one, and whether he responded correctly within the appropriate time interval. The perceptual loading is adjusted for each subject by changing the rate of presenting the spoken numerals so that the accuracy of the secondary task automatically is kept at a level of 90 percent.

These and other features and advantages of this invention will become readily apparent to those skilled in the art upon reference to the following description when taken into consideration with the accompanying drawings, wherein:

FIG. 1 is a general functional diagram of the present invention;

FIG. 2 is a functional diagram of the adaptive stressor data flow circuitry;

FIG. 3 is a functional diagram of the digit-tracking adaptive stressor details;

FIG. 5 is a functional diagram of the majority logic decision making for digit recognition;

FIG. 6 is a timing diagram for the signature recognition;

Figure 4:
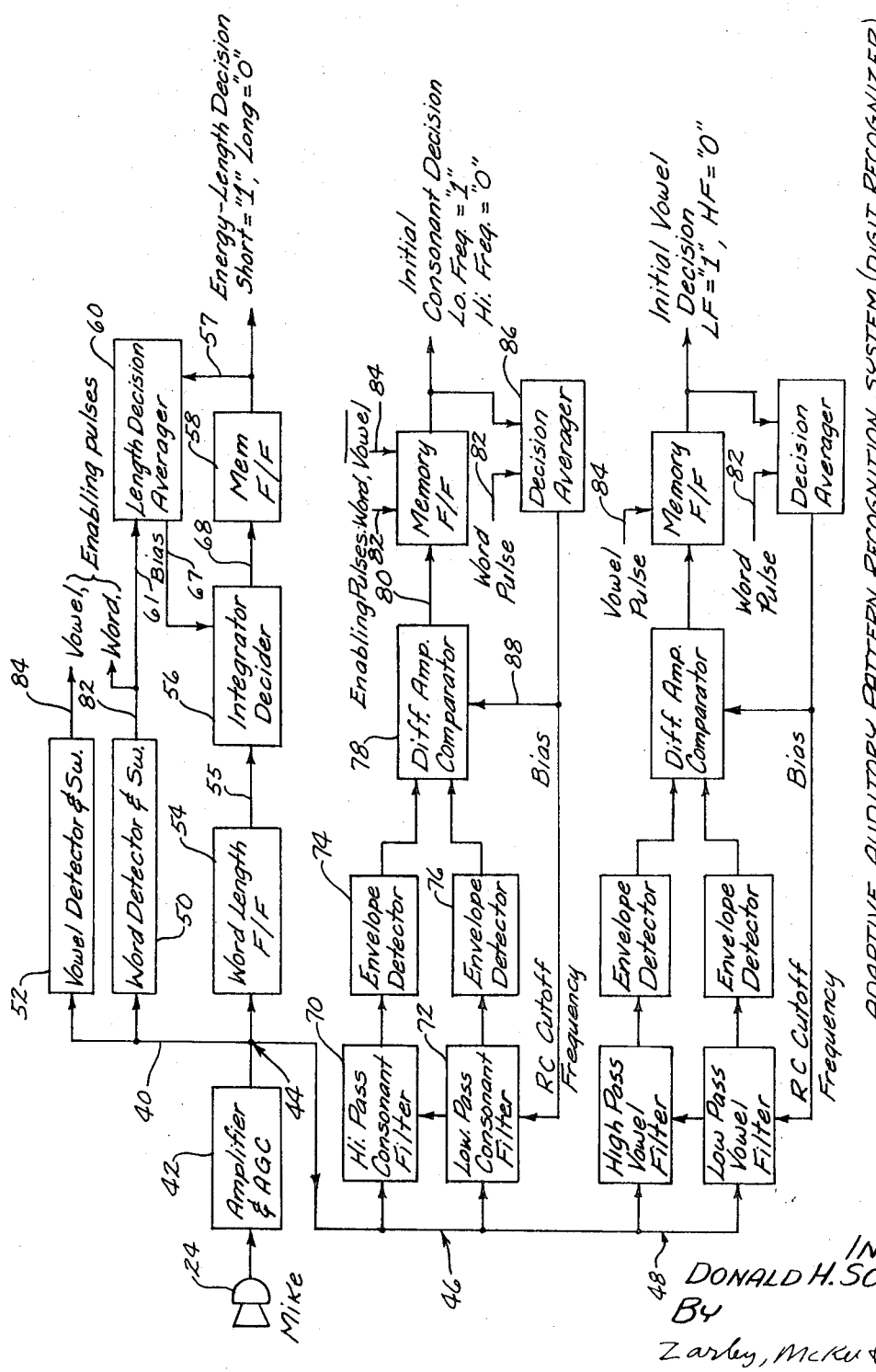
FIG. 4 is a functional diagram of the adaptive auditory pattern recognition system.

In FIG. 1 of the drawings of a driver simulator is referred to generally by the reference numeral 10 and includes a seat 12. The usual driving controls are located on the front panel 14 of the simulator 10. A single earphone headset 16 is provided for the trainee which although not shown will sit in the seat 12.

A movie film 18 that goes with the conventional driver simulator is used as a basic information storage element. On this 16 mm. film are the conventional scenes from driver training studies. At one side of the film images is the conventional sound track 20. On the other side of the film will be an added ferrite strip 22 to record the necessary commands for this particular driver simulator.

On this ferrite strip 22 possible commands are encoded. The particular commands are detail in FIG. 20 of my copending application. The commands are detected as tones on the ferrite strip as it runs through the movie projector and are translated into the appropriate command per channel. The presence or absence of the tone is taken to be the presence or absence of the command for that particular channel. The tone frequencies are decoded in the channel command decoder as a logical bit, that is a zero or one.

The 22nd channel at a nominal frequency of 5,600 cycles per second, or Hertz, is used to control the frequency of the projector. This frequency in the 22nd channel is indicative of how fast the projector film is running at that particular instant. This frequency, indicating projector speed, is compared in a frequency discriminator with the command frequency from a reference oscillator whose frequency is fixed stably at 5,600 Hertz. The difference is the error which controls the speed unit; this in turn controls the projector motor such that the speed of the film is controlled to be constant within very narrow frequency-speed limits.

What the student does in response to the driver training film and its commands is encoded by several devices on the student console. The information for those encoding details is shown in my copending application. The motions or position information are sensed about the student's responses as to brake, clutch, gas or accelerator pedal, steering wheel, turn signal, miscellaneous switch operation, and glance direction.

The student wears a headset 16 for adaptive stressing while in the student driver console. This headset presents information in a headphone to one ear, while the other ear is free or uncovered to listen to the sound track from the driver trainer film. A microphone 24 is part of the headset to detect the student's verbal response to tracking digit commands. Also a part of the headset are two accelerometers to sense glance motions of the head. The earphone and microphone are part of the digit tracking adaptive stressor loop, presented in detail in FIGS. 2 and 3.

The responses of a student are sensed at his student console and compared with the decoded commands from the driver trainer film in the comparator logic block. The errors or differences between command and student response are recorded on both a paper strip recorder as well as on a magnetic tape recorder for later computer analysis. The errors are also displayed as feedback information or commands to the student on his console display panel. Details on the display panel and on the command-response comparisons and their display are presented in my copending application.

DIGIT-TRACKING ADAPTIVE STRESSOR LOOP

Studies have shown that requiring a person to repeat a string of digits that he hears is stressful in terms of disrupting learned behavior. Following digits or digit-tracking in this case, means that the student has to divert some of his attention units from his primary task of driving the simulator and to following the auditory string of digits. The rate at which he follows digits here is a function of how correct the students are, this in turn depends on how much attention he devotes (or not) to his primary task of driving the simulator. Between these two tasks, driving the simulator and following digits, I will occupy 100 percent of the student's attention.

The overall operation of the digit-tracking adaptive stressor as indicated in FIGS. 2—4 is as follows. An endless stereo tape belt 30 is used as the memory for the spoken zeros and ones digits for the student to track. The upper channel on the stereo tape belt has a continuous series of "ones" spoken on it at the rate of two digits every second. The bottom channel of this tape belt has a similar string of spoken "zeros" recorded on it. Thus one can get a spoken zero or one merely by selecting the upper channel for ones or the lower channel for zeros. The selection of the desired digit is done by the pseudorandom number generator 31. The rate at which the digits are picked off the tape sets the rate at which the spoken digits are presented in the earphone 16 to the student. The rate at which spoken digits are presented is controlled by the comparator 32, which sets the word rate according to how accurately the student is following the random string of spoken ones and zeros.

ADAPTIVE AUDITORY PATTERN RECOGNITION SYSTEM

Auditory pattern recognition techniques are used to determine whether the subject said, "zero" or "one," or some other number (an error). The microphone 24 on the subject's headset detects the spoken digits and converts them into the corresponding electronic waveforms. The audio compander insures that the volume level feeding the pattern recognition circuits is constant. The auditory pattern recognition scheme utilizes three different characteristics of spoken speech in combination to determine whether a zero or a one or something else was said by the subject. The phonemic analysis of the spoken digits "0" and "1" are explained in detail below and the electronic implementation is given in FIGS. 3 and 4 for the pattern recognition.

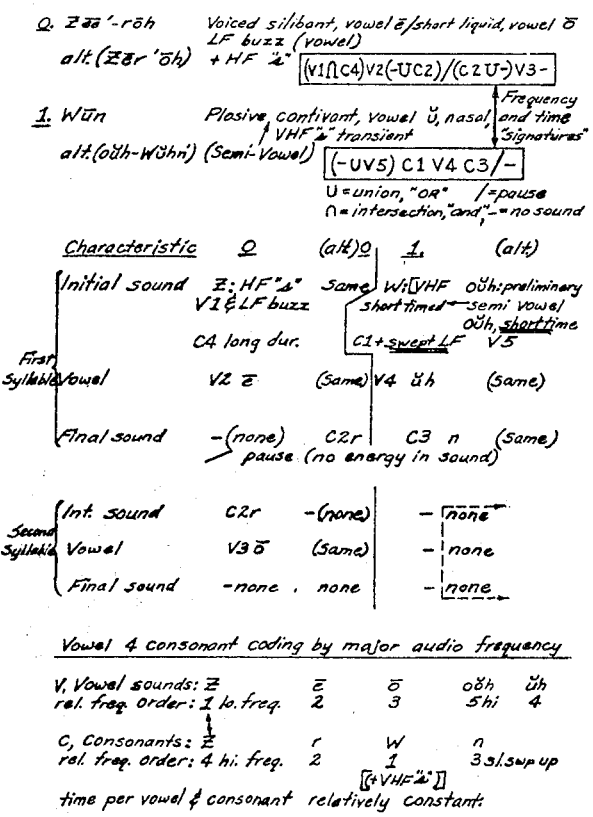

The output of the three speech characteristics circuits are each coded as one or zero, that is the output of the voicing circuit (vowel detector) could be a logical "one" indicating a spoken one also or it could be a logical "zero" indicating a spoken zero for consistency purposes. The energy word length detector and the consonant decision circuitry (consonant frequency) operate likewise. A majority voting logic is used to insure reliability. The majority voting logic thus requires a two out of three or a three out of three vote from the three circuits for reliable recognition. If an accuracy level of 90 percent for each circuit individually is assumed, then operating collectively the circuits should be right 99 percent of the time or 99.9 percent of the time when three out of three circuits agree. Using the two out of three decision-making logic thus means that an error would be made only once out of 100 times, when two out of the three decisions are wrong and the minority vote was correct. The output of the pattern recognition circuitry, the majority logic output, is a logical zero or one, corresponding to a spoken "zero" or "one." This is compared with the command word and used to adjust the rate of presenting digits to the subject.

The word rate adjusting feature works as follows: if the student is correct, the rate of selecting and presenting words to the subject increases slightly with each successive correct following of digits. If the word recognized is wrong, opposite to that presented to the subject, the rate will decrease abruptly down to some minimum level of presenting digits to the subject. A possible minimum level is one digit every 3 to 5 seconds and a possible maximum level could be two digits per second.

The student console responses, errors and digit rate are recorded. A paper strip recorder is used for feedback to the instructor and student analysis later. A magnetic tape recorder for feeding the data into a computer for subsequent statistical analysis is also used.

The unique features of the adaptive auditory pattern recognition system are the ones that enable the circuitry to adapt to individual characteristics of a speaker that are specific to him and that vary from speaker to speaker. Specifically, the three characteristics of speech that are used in this simple auditory pattern recognition are the energy or length of the spoken word, the frequency characteristics of initial consonants, high or low, and lastly the frequency characteristics of the initial vowel, whether low or high frequency. Further this circuitry is restricted to discriminating between the spoken digits "zero" and "one" or deciding that neither of these digits had been spoken.

SIGNATURE ANALYSIS OF "ZERO" AND "ONE"

FIG. 1 is the block or system diagram and gives the overall data flow for the individual adaptive circuits of the digit recognizer 39 (FIG. 2).

At the top of FIG. 4 is the data flow 40 that is common for all three adaptive circuits. The output of a microphone 24 is amplified and held to a constant level by the automatic gain control (AGC) circuitry 42. The constant amplitude output goes to the three adaptive circuits 44, 46 and 48, as well as to word and vowel detectors 50 and 52. These detectors have been described in my copending application. Briefly, the word detector 50 determines when a word has started and later when it has stopped on the basis of the sound energy's exceeding a certain threshold level. The vowel detector 52 determines when the vowel in the first syllable of a spoken word has started and when it stopped. The vowel detector 52 ignores the preliminary consonantal sounds and detects only the vowel sounds by virture of the relatively constant frequency energy of a vowel as compared to a consonant.

The adaptive energy word length decision circuit 44 is shown in FIG. 4. The constant amplitude audio frequency energy goes to the word length circuit 44. The word length circuit includes a flip-flop or bistable multivibrator 54 that turns on whenever a word is spoken and turns off again when the word is finished. This also is known as a Schmitt trigger, operating around a certain preset voltage level. The word length output pulse has a constant amplitude but its length varies with the length of the spoken digit. The integrator-decider circuit 56 puts out a pulse whenever the word length pulse has exceeded a minimum time duration. The output of the integrator-decider 56 goes to a memory flip-flop 58 which remembers whether the integrator-decider 56 put out a pulse corresponding to the long word "zero" or whether the integrator 56 had put out no pulse in response to the short word "one."

The output of the word length memory flip-flop 58 goes to majority logic decision-making pattern recognition circuitry as shown in FIG. 5, as well as to the length decision averager 60. The averager 60 keeps track of how many decisions of each type have been put out by the integrator-decider 56. The averager circuit 60 is enabled by the word detector 50, and over approximately a 1 minute period of time averages the word and the integrator-decider 56 pulses. If the string of spoken digits is 50 percent zeros, the averager 60 does not affect the integrator 56 bias. If the average is not 50 percent zeros, then a correction bias is applied to the integrator 56 such that the minimum time is lengthened or shortened appropriately to bring the percentage of "zero" decisions back to nearly 50 percent.

Figure 7:
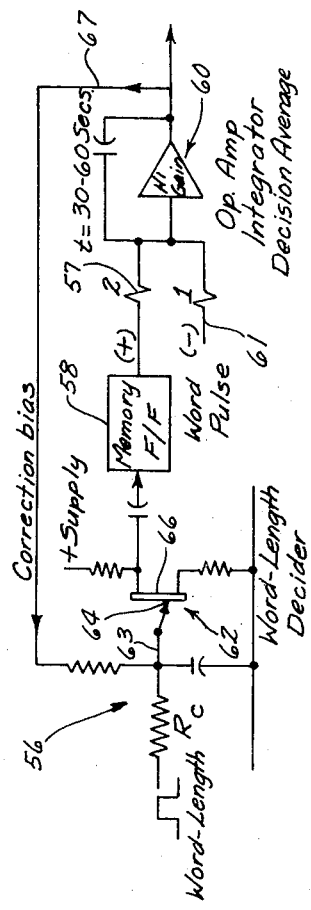
FIG. 7 is a wiring schematic of the adaptive word length decider circuit.

FIG. 7 gives circuit details of the adaptive word length decider circuit 44. This circuit has a unijunction multivibrator 62 with an RC integration circuit 63 receiving the output 55 of the word length flip-flop 54 and in turn feeding the emitter 64. Whenever the emitter 64 to base 66 1 voltage becomes sufficient, the unijunction oscillator 62 puts out a negative pulse. This pulse is lengthened and stored in the memory flip-flop 58. The word pulse feeds in with a gain of −1 and the operational amplifier 60 operating as an integrator, whereas the memory flip-flop 58 pulse 57 enters enters with a gain of +2. If exactly half of the words are long ones (zeros), the two inputs will neutralize each other overtime, and the output 67 of the averaging integrator will be zero; it will apply zero correction bias to the unijunction decider-integrator 56.

However, if the speaker had been talking fast, such that the circuit did not recognize that some of the fastly spoken zeros were actually zeros, then the word length integrator 56 would have more "one" decisions than "zero" decisions. The fewer-than-normal zero decisions would produce only a few pulses 57 from the memory flip-flop 58 to feed to the integrator-averager 60. However, the same number of word pulses 61 would be feeding this integrator 60 as before. The negative word pulses 61 would be feeding this integrator 60 as before. The negative word pulses 61 would result in a positive output 67 of the integrator-averager 60. This positive output 67 after approximately 1 minute would be fed back as a correction bias 67 to the unijunction oscillator 62 and increase its bias. Then the word length pulse 61 would not have to be quite as long as before to make unijunction oscillator 62 fire and get more "zero" decisions. Thus the circuit automatically adjusts its decision point such that in the long run, the word length decider circuit 44 decides that half of the spoken words on the basis of word length are "zeros" and the remainder are "ones." A similar situation exists for the correction bias 67 when more "zeros" are recognized than are actually spoken. The correction bias 67 would be negative and would require that the word length pulse 61 be longer than previously to result in a decision of zero. This would compensate for the person who is speaking more slowly than average.

The adaptive circuitry 46 for the initial consonant decision is shown in FIG. 4. High- and low-pass RC filters 70 and 72 are used to separate the energy bands of interest in the spoken "ones" and "zeros." The amounts of high frequency energy (a spoken "zero") and low frequency energy (a spoken "one") are detected by the appropriate envelope detectors 74 and 75. These are diode detector circuits 74A and 76A in FIG. 8 whose outputs feed a differential amplifier 78 as a comparator. The output of the comparator 78 is positive or negative depending on whether a high frequency consonant or low frequency consonant has been spoken.

The output 80 of the comparator 78 is sampled during a restricted period of time. The time period of interest for the initial consonant decision is the time between when the spoken digit starts, as determined by the start of the word detector pulse 82, and the start of the vowel in the first syllable, as determined by the start of the vowel pulse 84. The sampling here is started by the word pulse and stopped by the vowel pulse. The complement of the vowel pulse 84 is actually used to enable the duration of the time between the start of the word and the start of the vowel in the first syllable. Thus the output 80 of the differential amplifier comparator 78 is sampled only during the initial consonant of a word. The decision on the ratio of the high and low frequency components is remembered for the duration of the word pulse 82.

The output of the initial consonant decision circuit goes to the majority logic pattern recognition circuitry (FIG. 5), as well as to the decision averager 86. The decision averager 86 operates as described above. It takes the long term average of the spoken word and uses this output as a correction. The correction may be applied as a bias 88 to the differential amplifier comparator 78 to raise or lower its threshold appropriately to decide upon a high or low frequency initial consonant. Changing the comparator bias 88 may not be sufficient when the cutoff frequencies in the consonant low- and high pass filters 70 and 72 are not set appropriately. The cutoff frequency may actually be changed by changing the effective resistance in the circuit.

Figure 8:
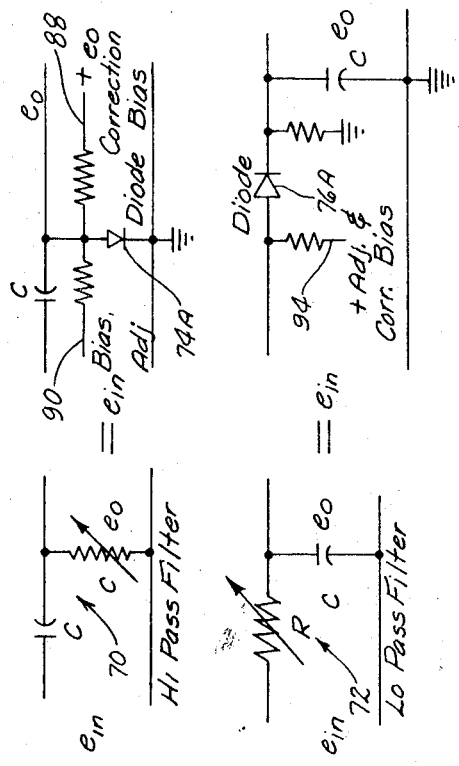
FIG. 8 is a wiring diagram of the high and low pass filter circuits with electronically controlled cutoff frequencies.

FIG. 8 shows details of how the cutoff frequency of the high- and low-pass filter circuits 70 and 72 may be changed electronically by changing the resistance in the circuit. The capacitance also could be changed by a −90° phase shift circuit operating as a capacity multiplier. Or a +90° phase shift circuit could be utilized as an inductance multiplier circuit. Field effect transistors also may be used as controlled resistors.

A high pass filter circuit 70 with a variable resistance R is shown in FIG. 8. The capacitor C stays the same in both the idealized circuit at the left and in the practical circuit implementation at the right, where the dynamic resistance of a forward biased diode 74A provides the controllable resistance R. Relatively small signals are fed into this circuit so that the diode 74A does not become nonlinear. Thus the signal meets only the relatively constant dynamic resistance of the diode 74A which is controlled both by an adjusting bias 90 and by a correction bias 88 from the decision-averager 86. When a large positive bias is applied to the diode the forward current through the diode increases and the dynamic resistance is low. When the positive bias is reduced towards zero, the resulting dynamic resistance is large. Care must be exercised not to reduce the total bias to zero or the diode 74A will start operating nonlinearly in its reverse bias region for part of the signal.

Also in FIG. 8 is a low pass circuit 72 with a variable series resistance R is shown. The right half shows how the diode 76A is connected to give the effective resistance R as the forward dynamic resistance of the diode 76A. As before suitable isolation resistors are employed to apply the summed correction and adjusting bias voltages 94 to the diode. The total of the adjusting and correction bias (90 and 88) applied to the diode (74A) (76A) in either filter configurations 70 and 72 must range from some small positive voltage to a large positive voltage. Zero and negative total bias voltages are now allowed.

The bottom part of FIG. 4 shows the block diagram for the initial vowel decision circuitry 48. This circuitry is quite similar to the circuitry for the initial consonant decision. The difference is that the memory flip-flop samples the output of the differential amplifier comparator only when the vowel in the first syllable is present. Another difference is that the RC cutoff frequency of the high- and low-pass vowel filter circuit is different than the cutoff frequency for consonants. Otherwise, the initial vowel decision circuitry operates the same as the initial consonant circuitry. Both circuits use high- and low-pass diode filter circuits wherein the diode is controlled to vary the actual cutoff frequency as shown in FIG. 8.

The output of the initial vowel decision circuitry goes to the majority logic voting pattern recognition circuitry as shown in FIG. 5.

The low- and high pass RC circuits 70 and 72 may be added together in series as desired to give a sharper cutoff frequency. In this case an isolation amplifier with a high input impedance should be added between the filter sections.

PHONEMIC ANALYSIS OF THE SPOKEN DIGITS "0" & "1"

An idiosyncratic phonemic analysis was done (see page 8). The two spoken digits "0" & "1" can be spoken with minor variations. The word "zero" alternatively can be pronounced "Zēē'-rōw" or "Zēr 'oh," and the word "one" can be pronounced "Wŭn" or "Ooh-Wuhn.'" The vowel sounds and consonant sounds were considered separately by their relative frequencies. The vowel sounds considered were z, e, o, ooh, uh, ranked in this order of frequency from low to high, indicated by V1 through V5 respectively. The consonant sounds similarly were ordered on the basis with respect to relative frequency as follows: w, (swept upward), r, n, (slight upward sweep), z, from lowest to highest and indicated by C1 through C4 respectively. The time duration of the consonant and vowel sounds was judged to be relatively constant.

For further reference, see Geldard (1953).* In particular certain consonant sounds have two or more frequency bands. As a result, the above first approximation may have to be modified.

*Geldard, F. A. The human senses. New York: Wiley, 1953. x, 365. pp. P. 100.

The spoken words, "zero" and "one" then were characterized by the sequence of vowel and consonant sounds with V for vowel and C for consonant with the number indicating the relative frequency. Set theory notation was used with the inverted U indicating intersection or conjunctive operator and the U-symbol indicating union or the alternative operator. A dash indicates that no syllable is present and a slash or fraction bar indicates the pause between syllables. Thus the spoken digit "zero" can be characterized as (V1∩C4) V2 (−UC2) /(C2U−)V3−. The spoken digit "one" can be characterized as (−UV5) C1V4C3/−. These two set theory notations for the spoken digits can also be considered to be their frequency-time signatures. It is these frequency and time signatures that are used in the electronic implementation of circuits to differentiate between these two digits.

SIGNATURE RECOGNITION LOGIC

The two wave forms in FIG. 6 show the approximate duration of the set pulse and that of the first vowel pulse; these time or enable the remaining circuitry. The set pulse starts whenever energy is detected by the envelope detector for any spoken word. The duration is about 0.7 of a second but is adjustable. Whenever the set pulse disappears, the reset pulse is present and is used to reset the circuitry. The first vowel pulse appears whenever the relatively constant energy of a vowel is detected and is approximately 0.1 seconds or sooner after the set pulse has appeared at the start of a spoken digit. This first vowel duration is estimated to last 0.1 to 0.3 seconds and its pulse duration is adjustable. The first vowel pulse thus indicates the presence and duration of the first vowel in the spoken digits "zero" or "one." The first vowel pulse obviously is zero when the second vowel in "0" appears.

FIG. 5 shows the majority logic decision-making in the digit recognition. The first operational amplifier performs the implementation of recognizing a spoken "0." The three characteristics going into the recognition are that the energy length or syllable counter had to have counted two syllables, that the initial consonant be high frequency ("z") and that the initial vowel be a low frequency one ("e"). A level adjustment is used to insure that if three out of these three characteristics or two out of the three characteristics agree, that they will outweigh the negative 10-volt input and produce a negative output indicative of "zero." If only one of the three characteristics deemed necessary for a spoken "zero" is present, the −10 volts overrides this single characteristic and the output of the operational amplifier is positive, signifying not "zero." The operational amplifier output is examined only when a delayed set pulse is present. The delay is to let the energy length-syllable counter operate fully. Thus the memory flip-flop can be set only when a delayed set pulse is present or immediately after a word has been spoken into the microphone. The output is a logical zero whenever something other than "zero" has been spoken and is a logical one whenever "zero" has been spoken. This somewhat confusing and arbitrary decision preserves a positive logic of "1" meaning a given signal exists. A similar situation arises with a spoken "one."

The bottom part of the circuitry illustrates the implementation of recognizing a spoken "one." The three characteristics of importance here are that the energy length-syllable counter had to have counted just one syllable, an initial low frequency consonant sound ("w"), and an initial high frequency vowel sound ("uh"). A majority logic scheme is used, if two out of these three, or if three out of these three characteristics are present, the digit is recognized as "one." The logic voltage levels are such that two out of three or three out of the three inputs override the level adjust input and the output correspondingly will be negative. If merely any one out of these three characteristics is present, its input will be insufficient to override the −10 volts coming from the level adjust. Then the sum of the input voltages will be negative resulting in a positive output indicating "not one" was present.

A recognition error occurs in the case if both the "0" and "1" outputs are zero. This can occur if the person said something else than a "0" or "1" or if the recognition circuitry had been set incorrectly. An error recognition light on the panel would be lit and the driver would have to repeat his digit into the microphone while the technician made adjustments to the recognition circuitry. A combination of logic and circuits can be used to implement the majority voting scheme instead of the analog method shown here.

ADAPTIVE STRESSOR

The free-running oscillator (FIG. 2) is used as the pseudorandom number generator 31. It has outputs of logical zero or one, corresponding to zero volts or +10 volts. Since the maximum rate of speaking the digit "zero" or "one" is 2 per second, it is assumed that the output of the free-running oscillator would indeed be sampled at random time intervals. The purpose of the sample-and-hold switch 33 is to examine the output of the free-running oscillator 31 and then to retain this information for the duration of one spoken digit. The sampling is done within 0.1 milliseconds and the oscillator 31 state of +10 volts or zero volts is determined and then held for the duration of a spoken digit. A bias in the ratio of spoken "zeros" and "ones" can be introduced by adjusting the ON time of the free-running oscillator 31; if the ON time of the oscillator 31 is greater than 50 percent, then more "ones" will be commanded.

The command word, the stretched output of the free-running oscillator 31, is used to select a spoken "zero" or "one" off the endless two track tape loop via selecting either the bottom track ("0") or the top track ("1"). The word selector 33A is turned on by the gating switch 33 and continues sampling one tape track until the start and stop of a spoken digit is detected.

The word start-stop detector 33B is necessary to insure that a spoken digit is picked off the tape. The word selector 33A is started by an output of the sampling switch 33 and is stopped whenever the spoken digit from the tape 30 stops. The output of the word start-stop detector 33B passes a spoken digit, a "zero" or "one," to the headphone 16 for the student driver to listen to.

The command-spoken word comparator does just that. The student driver has to repeat into the microphone 24 whether he thought he heard a spoken "zero" or a spoken "one." The digit recognition circuitry 39 has an output a "one" or "zero" appropriately. The comparator circuit 32 compares the command word with the spoken word recognized. If the command and recognized words agree, this is counted as a hit and a correct pulse results. If the outputs disagree, the correct pulse is missing and an error is recorded in the counter and on the two recorders.

The command-recognized word comparator 32 adjusts the spoken digit rate to the student driver. To allow for the student drivers' having to pay attention to driving and ignoring the spoken words, the word start-stop detector 33B energizes a wait multivibrator 33C for a maximum delay of 5 seconds which is about the maximum permissible in recognizing a digit. If the student ignores the digit for more than 5 seconds, the rate of presenting further digits is slowed down. The outputs of the wait multivibrator 33C and the commanded-word recognized-word comparator 32 are summed in an AND gate 102. If a correct pulse occurs within 5 seconds after speaking a digit, a pulse is sent to the unijunction multivibrator 104 whose frequency is controlled by voltage. The frequency of the voltage-controlled oscillator 104 increases for each correct pulse and drifts downward each time an error is made. The lower limit is 0.2 pulses per second and the high limit is 2.0 pulses per second corresponding to two spoken digits per second.

Thus it is seen that the device accomplishes all of its stated objectives.

I claim:

1. A driver simulator, comprising,
   a movie film for portraying a series of driving situations projected on a screen in view of a driver station on a driver trainer unit,
   an adaptive stressor unit having an audio unit which provides secondary auditory perceptual loading sound patterns on the student in the driver trainer unit,
   an auditory pattern recognition device that includes an audio pickup to receive the audible responses from the student in response to the sound patterns from the stressor unit,
   said auditory recognition device including an indicator for indicating correct and incorrect audible responses from the student as compared with the sound patterns from the audio unit of the stressor unit,
   said recognition device indicator being coupled to said stressor unit to control the rate of loading on the student, and
   said auditory recognition device including three adaptive circuit means for registering the energy and length of the spoken word, the frequency of the initial consonants, and the frequency of the initial vowel.

2. The structure of claim 1 wherein said audible responses from the student include only the words zero and one.

3. The structure of claim 2 wherein said auditory recognition device includes a word detector responsive to the sound energy exceeding a predetermined threshold level for determining when a word has started and when it has stopped, a vowel detector for determining when the vowel in the first syllable of the spoken word has started and when it has stopped by recognizing the constant frequency energy of the vowel.

4. The structure of claim 3 wherein the adaptive means for registering the energy and length of the spoken word includes a word length circuit adapted to be turned on in response to a word being spoken and turned off again when the word is finished, said word length circuit having an output when turned on received by an integrator-decider circuit adapted to provide an output whenever the word length pulse has exceeded a predetermined minimum time duration, a memory means receives an output pulse from said integrator-decider corresponding to the long word zero and registers no pulse in response to the short word one, and the output of the memory means is received by a majority logic decision making circuit.

5. The structure of claim 4 wherein the output of the memory means is received by a decision averager adapted to register the number of pulses received from the integrator-decider, said decision averager being enabled by said word detector such that over approximately 1 minute period of time the word and integrator-decider pulses are averaged, upon the average falling below 50 percent zeros a correction bias is applied to the integrator such that the minimum time is lengthened or shortened approximately to bring the percentage of zero decisions to approximately 50 percent.

6. The structure of claim 4 wherein the adaptive means for registering the frequency of the initial consonants includes high and low pass filters adapted to separate energy frequency bands, and a pair of envelope detectors are adapted to receive the output of the high- and low-pass filters which in turn feed a differential amplifier comparator, the output of the comparator being positive or negative depending on whether a high frequency consonant or a low frequency consonant has been spoken, a memory means connected to said comparator and said vowel and word detectors for receiving the output of the comparator during a restricted period of time established by when a spoken digit starts as determined by the start of the word detector pulse, and the start of the vowel in the first syllable as determined by the start of the vowel pulse whereby the restricted period is started by the word pulse and stopped by the vowel pulse and the memory means receives a signal from the comparator only during the initial consonant of a word, and the ratio of the high and low frequency components is remembered for the duration of the word pulse, and the output of the memory means is connected to the majority logic recognition decision circuit.

7. The structure of claim 6 wherein said adaptive means for registering the frequency of the initial vowel includes high- and low-pass filters adapted to separate energy frequency bands, a pair of envelope detectors are adapted to receive the output of the high- and low-pass filters which in turn feed a differential amplifier comparator, the output of the comparator being positive or negative depending on whether a high frequency vowel or a low frequency vowel has been spoken, a memory means connected to said comparator and said vowel detector for receiving the output of the comparator during a restricted period of time established by when a vowel in the first syllable is present as determined by the vowel detector pulse being received by the memory means, and the ratio of the high- and low-frequency components is remembered for the duration of the word pulse; and the output of the memory means is connected to the majority logic recognition circuit.

8. The structure of claim 7 wherein said majority logic recognition circuit includes an output signal indicating a one or a zero was spoken depending on the output of energy and length adaptive circuit, the frequency of the initial consonant adaptive circuit, and the frequency of the initial vowel adaptive circuit compared with a predetermined output pattern, the outputs of two or more of said adaptive circuits controlling the output of said majority logic recognition circuit.

9. The structure of claim 1 wherein a majority logic recognition circuit is connected to the outputs of said three adaptive circuit means and the output signal thereof indicates a one or zero was spoken depending on the output of said three adaptive circuit means compared with a predetermined output pattern, the outputs of two or more of said three adaptive circuit means controlling the output of said majority logic recognition circuit.